(12) United States Patent
Smith

(10) Patent No.: US 7,679,850 B2
(45) Date of Patent: Mar. 16, 2010

(54) POSITION DETERMINATION USING CIRCULAR SHIFT CODES

(75) Inventor: Steven Craig Smith, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 430 days.

(21) Appl. No.: 11/747,538

(22) Filed: May 11, 2007

(65) Prior Publication Data

US 2007/0263311 A1 Nov. 15, 2007

Related U.S. Application Data

(60) Provisional application No. 60/747,066, filed on May 11, 2006.

(51) Int. Cl.
*G11B 20/14* (2006.01)

(52) U.S. Cl. ............................... 360/40; 360/48; 360/75

(58) Field of Classification Search ........................ None
See application file for complete search history.

(56) References Cited

U.S. PATENT DOCUMENTS

| | | | |
|---|---|---|---|
| 6,985,316 | B1 | 1/2006 | Liikanen et al. |
| 7,019,937 | B1 | 3/2006 | Liikanen et al. |
| 7,136,253 | B1 | 11/2006 | Liikanen et al. |
| 7,471,481 | B2 * | 12/2008 | Lau et al. ...................... 360/75 |

FOREIGN PATENT DOCUMENTS

JP 2006194773 A * 7/2006

\* cited by examiner

*Primary Examiner*—Jason C Olson
(74) *Attorney, Agent, or Firm*—Westman, Champlin & Kelly, P.A.

(57) ABSTRACT

A shift code that consists of N-symbol code words is provided as an L-symbol "master sequence" in which no sub-sequence of N symbols repeats, where $L \leq S^N$ and S is the number of code symbols. A decoder determines a location in the code from N decoded symbols. The code locations may, for example, correspond to radial positions, or other position, times, and so forth. In one embodiment, the master sequence is continuously written to a data storage disk during a spiral write operation and a reader on a given circular track reads at least N symbols from the portion of the spiral that crosses the track and determines a code word. The radial position of the reader is then determined based on the location of the code word in the code.

17 Claims, 6 Drawing Sheets

DECODING TABLE

POSITION DETERMINATION USING CIRCULAR SHIFT CODES

CROSS-REFERENCE TO RELATED APPLICATION

The present application claims the benefit of U.S. Provisional Patent Application Ser. No. 60/747,066, which was filed on May 11, 2006, by Craig Smith for CIRCULAR SHIFT CODES and is hereby incorporated by reference.

BACKGROUND

1. Field of the Invention

The invention relates generally to circular shift codes, and more particularly, to codes for providing indications of position within spiral-written servo information.

2. Background Information

It is known to provide servo information to a data storage disk through a spiral write operation. The spiral write operation reduces the time required to write the servo information on the disk, from what would otherwise be a circumferential write operation per track. As part of the spiral write operation, a servo track writer moves a write head in a controlled manner, that is, at a constant velocity or along a velocity profile, from an outer diameter of the disk to an inner diameter of the disk (or vice versa) as the disk spins, such that a given spiral crosses each circular track only once. As needed, multiple spirals may be written.

For a spiral write operation, the write head is continuously enabled while the head is moved over an entire stroke from the outer diameter to the inner diameter, or vice versa. In systems of interest, synch marks consisting of a small bit pattern are written at fixed time intervals within the spiral, to aid in transducer position determination. Since the servo track writer moves the write head at a known velocity and the time intervals between the synch marks are known, the distances between respective synch marks along the spiral can be determined. Each synch mark corresponds to a unique radius, and a count of the synch marks from a reference radius provides radial position information. The system must, however, maintain an accurate count as the transducer moves over the disk, that is, servos on the spirals, in order to provide accurate radial position information.

The spiral may, for example, be written as a single frequency pattern, with the synch marks embedded in the spiral as phase shifts. A reader reads from the portion of the spiral that crosses a given circular track and the associated read envelope is rhomboidal in shape. The peak of the read envelope occurs when the center of the spiral write pattern coincides with the magnetic center of the reader. Precise position information can be determined based on where the centralmost synch mark occurs in the read envelope relative to the centroid of the read envelope. The synch marks work well for precise position determination, however, for radial position determination they require that the count be maintained, as described above.

SUMMARY

A shift code that consists of N-symbol code words is provided as an L-symbol "master sequence" in which no subsequence of N symbols repeats, where $L \leq S^N$ and S is the number of code symbols. A decoder determines a location in the code from a decoded N-symbol code word. The code locations may, for example, correspond to radial positions, or other position, times, and so forth.

In one embodiment, the master sequence is continuously written to a data storage disk during a spiral write operation. A reader reads at least N symbols from the portion of the spiral that crosses a given circular track and determines radial position based on the location of a decoded N-symbol code word in the code.

BRIEF DESCRIPTION OF THE DRAWINGS

The invention description below refers to the accompanying drawings, of which:

FIG. 3 depicts a decoding table;

DETAILED DESCRIPTION OF AN ILLUSTRATIVE EMBODIMENT

A shift code that consists of N-symbol code words is provided as an L-symbol "master sequence" in which no subsequence of N symbols repeats, where $L \leq S^N$ and S is the number of code symbols. A decoder determines a location in the code from N decoded symbols, that is, from a code word. The locations in the code may, for example, correspond to radial positions, or other positions, times, and so forth.

An embodiment consists of the circular shift code, that is, the master sequence, continuously written during a spiral write operation to provide, without a count maintained from a reference radius, an indication of a radial position of the read head. The code, which is written at a known constant velocity or following a predetermined velocity profile, produces one or more predetermined code words at the respective circular tracks, that is, at the respective spiral crossings. A reader reads the one or more code words from a given track and the system determines the position of the reader by decoding the one or more code words into a radial position. The code words read by the reader at different but nearby radial positions are necessarily different, and thus, the relative radial position of the reader can be unambiguously determined from the one or more code words. Based on the length of the code, as discussed below, the radial position can be unambiguously determined over all of the tracks of the disk or over ranges of the tracks. As also discussed below, fine positioning information can be determined from a smaller number of bits or symbols.

Further, the code words are preferably overlapping in nature, such that an error is detected if the symbol following a code word is not the expected symbol in the master sequence. The period of the code pattern, that is, the length of the repeating master sequence, must be sufficiently long such that the portions of the patterns read from adjacent tracks differ by at least the number of symbols that distinguish one code word from another. The bit patterns recorded in the respective circular tracks need not be unique over the entire disk, however, because a coarse position of the reader, that is, the radial position to within a range of tracks, will be known from other measurements, such as, for example, the orientation of the actuator that supports the reader.

If multiple spirals are used, codes of varying length or the same code with offset phases can be used for the respective spirals. This allows the system to determine the position of the reader with fewer ambiguities, given the repeating nature of the master sequence. If one cycle of the master sequence proves sufficient to determine position within the coarse positioning track range, the code need not be circular. However, if the master sequence repeats within this range, the code should be circular.

Figure 1:
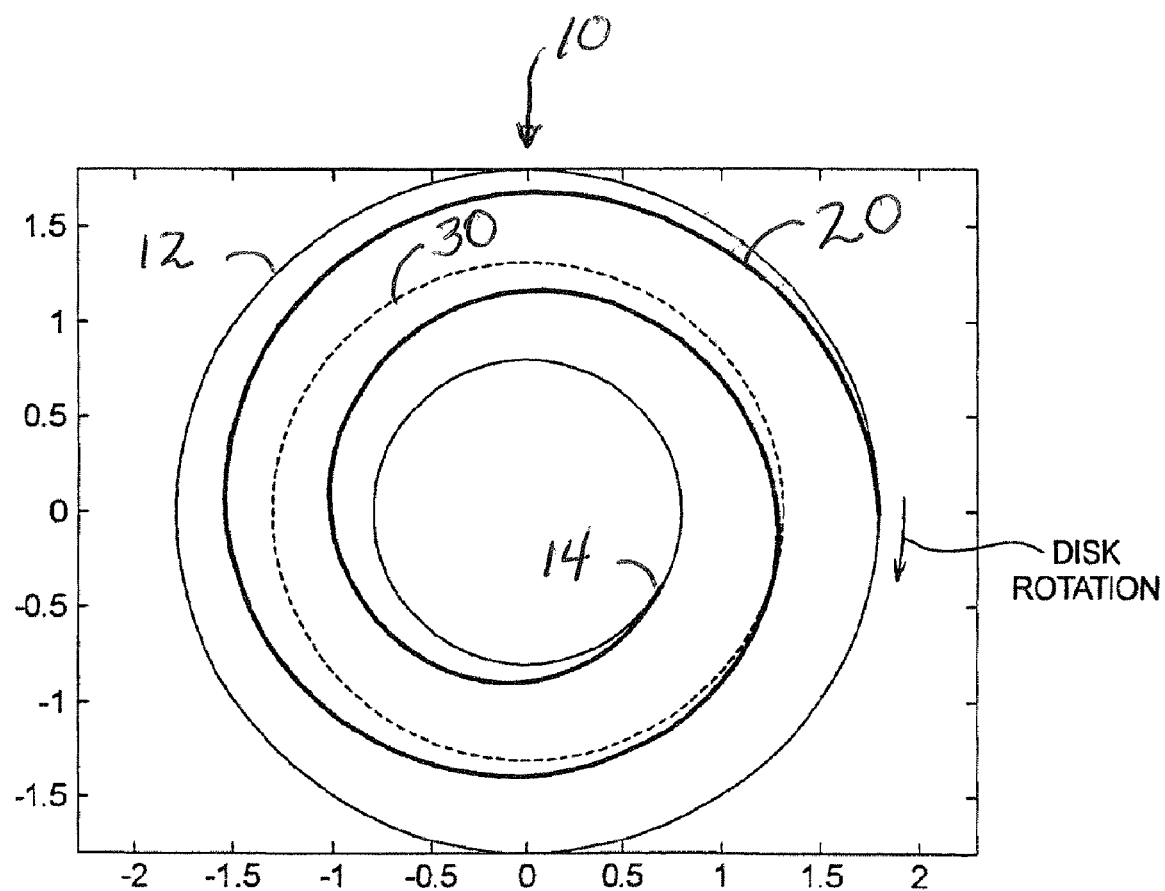
FIG. 1 depicts a disk with a spiral recorded in accordance with the inventive code.

Referring now to FIG. 1, a disk 10 includes a spiral 20 that is written by a servo writer (not shown) from the outer diameter 12 to the inner diameter 14 of the disk. The spiral write, which crosses a given circular track 30 once, consists of a continuously repeated "master sequence" of L symbols, where L is the code length and $L \leq S^N$, S is the number of code symbols and N is the number of symbols per code word. The N-symbol code words overlap by N−1 symbols, and thus, reading any N of the symbols of the master sequence produces a code word of the cyclic, or circular, shift code. The symbols may be binary symbols, that is, 1s and 0s. Alternatively, the symbols may consist of multiple bits, that is, the symbols may be elements of, for example, a ternary code. The example described below has binary symbols and the code words are four symbols long and overlap by 3 symbols. The master sequence, which represents a string of adjacent code words, and in which no N-symbol subsequence repeats, is 16 bits long.

The master sequence in the example is:

0000111100101101

Any 4 consecutive bits of the sequence is a code word of the circular, or cyclic, shift code. The first few code words are 0000, 0001, 0011, 0111, which are each a one-bit shift along the master sequence. A full list of the code words is set forth in FIG. 3 as part of a decoding table. The sequence circularly shifts, or repeats, to produce the 16 code words and start again at code word 0. For example, code word 12, is produced by shifting to the last four symbols in the master sequence and code word 13 is produced by a circular shift to the first symbol of the master sequence. The code words 14 and 15 are similarly produced by circular shifts, and a next shift produces code word 0.

The master sequence is continuously repeated over the entire stroke from the outer diameter 12 to the inner diameter 14. Accordingly, each circular track 30 on the disk receives a portion of the master sequence that is consistent with the time at which the spiral write 20 crosses that track.

Figure 2:
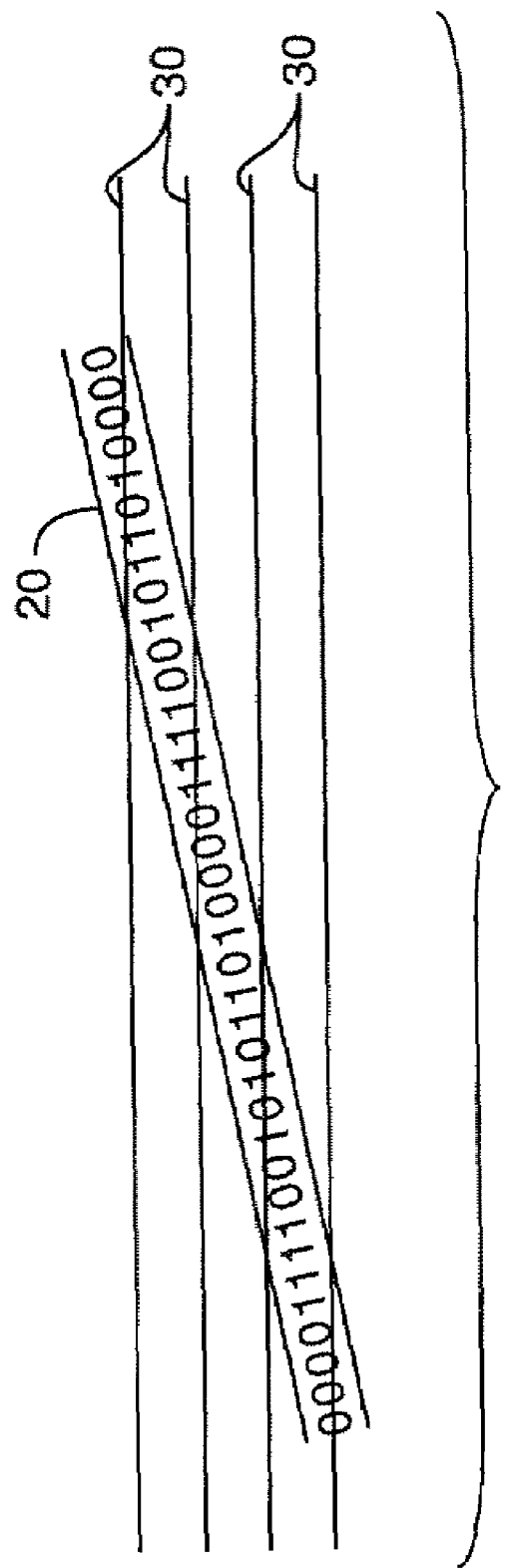
FIG. 2 illustrates the code written in the spiral crossing of adjacent tracks.

Referring now also to FIG. 2, as the master sequence is repeatedly written to the disk 10 in a spiral write operation, different portions of the master sequence are written to different circular tracks 30 in accordance with the constant velocity, or the velocity profile, and the skew of the write head. Thus, each track receives a predetermined portion of the repeated master sequence, and the code written in adjacent tracks differs by at least a number of symbols that is sufficient to resolve one code word from another. In the example, the resolution is one code symbol, and as illustrated in the drawing, the spiral writing 20 of the master sequence in a number of circular tracks 30 produces different code words in the respective tracks.

FIG. 3 shows a decoding table for the code. The table is set up such that the radial direction is vertical and the tangential direction horizontal, to correspond to the master sequence. As is understood by those skilled in the art, the time at which the reader crosses the spiral on a given circular track is based on the radial distance of that track from, in the example, the outer diameter of the disk. One important feature of this code is the overlapping nature of the code words, that is, the last three symbols in the code word C are the first three symbols in the code word for C+1. Thus, much like adjacent symbols of a grey code are discernable with a resolution of one symbol, the code words of this master sequence are similarly discernable with a one symbol resolution.

The advantage of the master sequence, however, is that every symbol can be a code word boundary, since each reading of N symbols, here bits, is a code word. Further, the code provides an error detection capability, since an error is detected if the next symbol read after a code word is not the next expected symbol of the master sequence, that is, is not the last symbol of the next, adjacent, code word.

Figure 4:
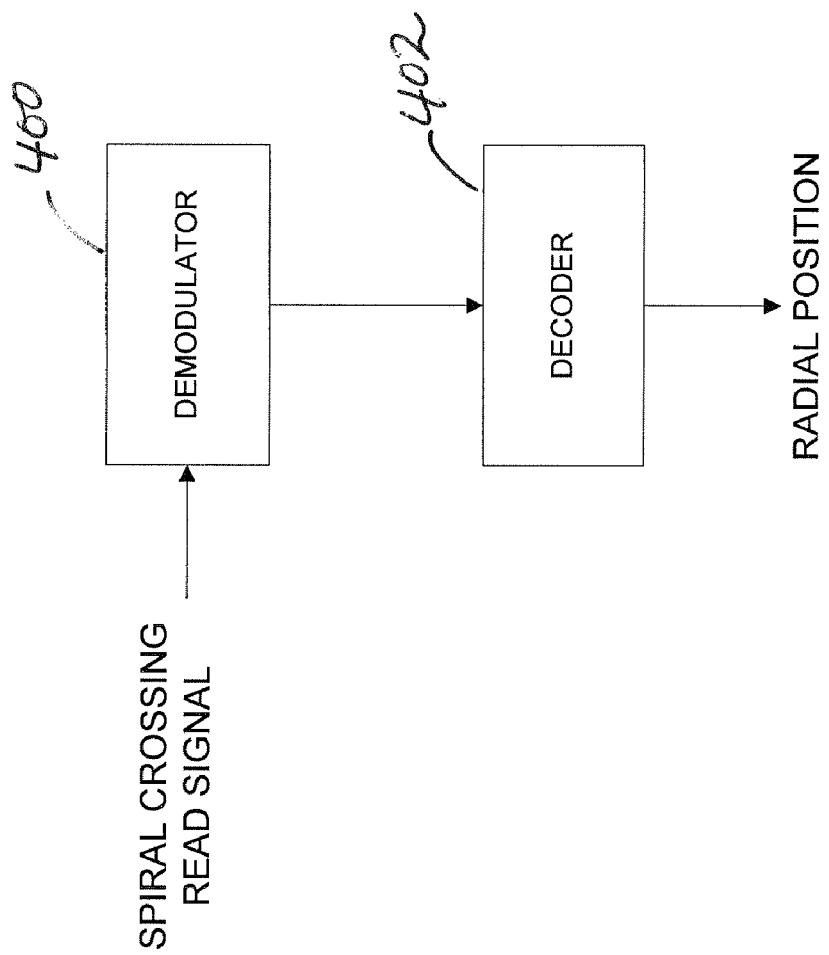
FIG. 4 is a functional block diagram of a decoding system.

Referring now also to FIG. 4, as a reader traverses, or crosses, a spiral in a constant radius read operation, the reader provides a read signal to a demodulator 400 which, operating in a conventional manner, demodulates bits and produces a corresponding code word. The code word is supplied to a decoder 402, which in the example is a lookup table that lists the radial positions that correspond to the various code words. Using the code word to enter the table, the table produces a corresponding radial position. The system may, as appropriate, read multiple code words from the spiral crossing and use any or all of the multiple code words to enter the table.

The radial position provided by the lookup table 402 may be unique to the disk, if the code is sufficiently long, and the spiral crossing correspondingly wide. Otherwise, the radial position is unique within a range of tracks defined by the coarse positioning provided by, for example, the orientation of the actuator (now shown) that positions the reader, or other measurement information.

Figure 5:
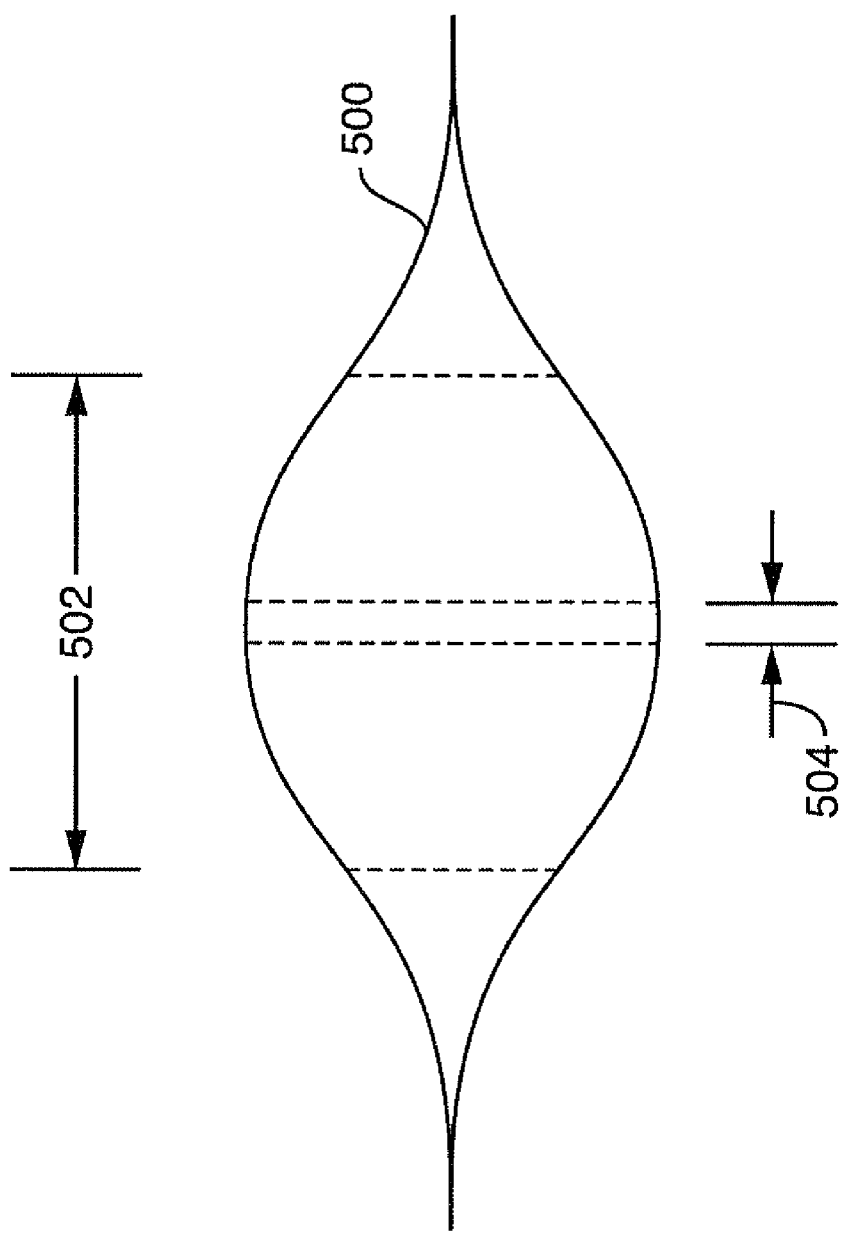
FIG. 5 illustrates a read envelope.

The signal read while crossing a spiral on a given track has a characteristic read envelope 500 that is rhombodial in shape, as depicted in FIG. 5. Accordingly, there is a centroid region 502 within the read envelope in which the read signal has sufficient signal strength to be demodulated into symbols by the demodulator 400. The envelope peak 504 corresponds to the reader being centered on the spiral write in the track.

The bit pattern read while crossing the spiral may also be used for fine positioning by determining the position of the read envelope peak 504 relative to a sub-grouping of the recorded bits. For example, a given bit of the recorded N bit code word may represent a precise along-track position and the difference between the read envelope peak and the bit represents a precise position error.

Figure 6:
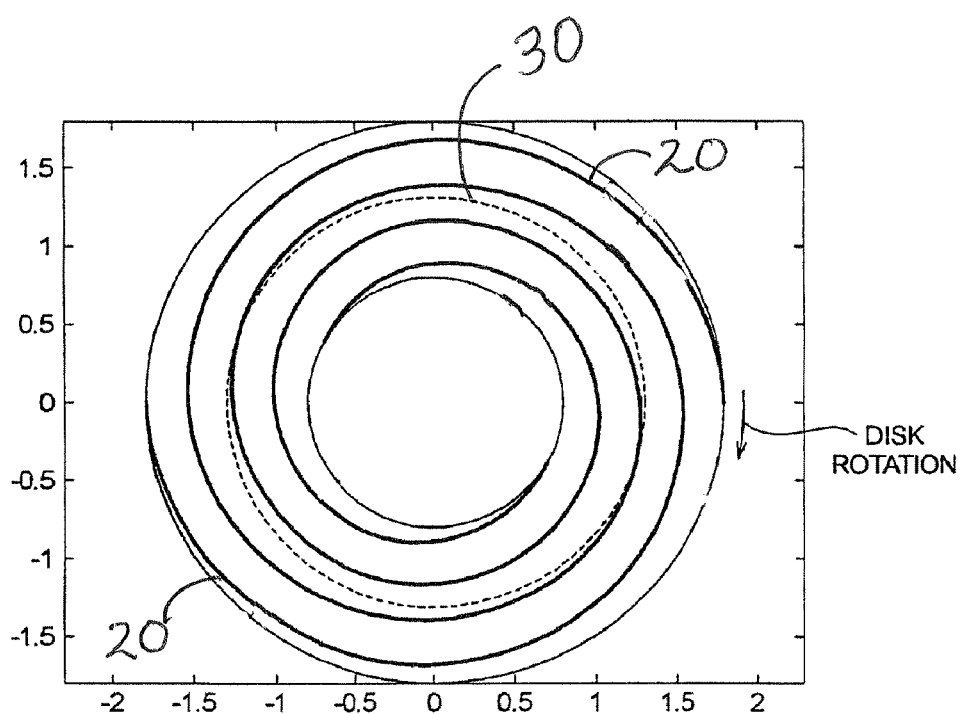
FIG. 6 depicts a disk with multiple spirals recorded in accordance with the invention.

As depicted in FIG. 6, multiple spirals 20 may be recorded with respective codes or with the same code at respective phase offsets. The radial position can be determined using code words read at a constant radial position, i.e., from a circular track, while crossing all or certain of the plurality of spirals. The uniqueness of the solution for position determination is then based on the length of the combined codes, since the respective spirals are equivalent to interleavings of the codes. Alternatively, the code words read from the different spirals can be used in a manner that is analogous to a Vernier scale, with one code providing information that acts as a "fine tuning" of the position information provided by another code. If, for example, three codes are used that have 5, 11 and 17 symbols, respectively, recording the codes on separate spirals such that the codes can be decoded independently provides an effective code length of 5*11*17=935 code words. If the three codes are interleaved and recorded on the respective spirals, and the radial motion is less than 2.5 symbols from one spiral to the next, i.e., less than one-half of one code word of the shortest code, you can determine the position to within one symbol at each spiral based on the 935 code words.

As discussed earlier, the code provides error detection, with an error detected if the next symbol read after a code word is not the expected symbol from the master sequence.

The code can also provide error correction if a sufficiently long string of symbols can be read from a spiral crossing. The decoding of the symbols may be subject to error correction coding, also.

The code word symbols may be decoded from other signals, such as multi-bit patterns that are interpreted as, for example, symbols of a ternary code. The advantage of using larger symbols is a longer code length, which grows as a power of the number of code symbols.

The circular shift code may alternatively be used to provide timing information when, for example, relative position or distance is a known quantity.

The example code has a code efficiency of $$\frac{16}{4}$$

or 4, that is, twenty-five percent of the total master code length must be read to resolve the position within the master code. Other examples are a code with 8-bit symbols has a length of $2^8=256$ and an efficiency of 32, such that $$\frac{1}{32}$$

of the master code must be read to determine the position within the master code. Further, longer symbols provide greater efficiency. Consider that a 10-bit symbol and a 5 symbol long code word has a code length of 100000, such that a 5-symbol code word, that is, 50 bits of the master sequence, can be used to determine one location out of 100,000 possible locations. Such a code can thus be decoded to a corresponding number of radial positions.

The foregoing description has been limited to a specific embodiment of this invention. It will be apparent, however, that variations and modifications may be made to the invention, for example, the spirals may be written from the inner diameter to the outer diameter, the code words may overlap by fewer symbols, and so forth, with the attainment of some or all of its advantages. Therefore, it is the object of the appended claims to cover all such variations and modifications as come within the true spirit and scope of the invention.

What is claimed is:

1. A method comprising utilizing a data writer to write a sequence that corresponds to a code with N-symbol code words, the sequence having L symbols with every N-symbol subsequence being non-repeating; and determining a location in the code by decoding an N-symbol code word.

2. The method of claim 1 wherein the code is circular and the step of providing includes providing at the end of the sequence at least one symbol from the beginning of the sequence.

3. The method of claim 1 wherein the location in the code corresponds to a radial position.

4. A method comprising: writing to respective radial positions portions of a master sequence that corresponds to a code with N-symbol code words, the sequence having L symbols in which every N-symbol subsequence is non-repeating; reading at least N symbols of the master sequence from a radial position and determining a code word; determining the radial position based on the location of the code word in the code, and wherein the step of writing portions of the master sequence is a spiral write operation from one diameter of a data storage disk to another diameter of the disk, in which the master sequence is repeatedly written.

5. The method of claim 4 wherein the step of reading is reading from a spiral at a constant radial position.

6. The method of claim 4 wherein the sequence corresponds to a code of length L with N-symbol code words in which the code words overlap by N−1 symbols, and any N symbols of the master sequence produce a code word.

7. The method of claim 6 wherein the code is circular.

8. The method of claim 4 wherein the radial position of the reader is relative to a range of tracks on the disk.

9. The method of claim 4 further including a step of detecting an error if the next symbol read is not the next expected symbol in the master sequence.

10. The method of claim 9 further including a step of correcting the error based on additional symbols read from the radial position.

11. The method of claim 5 further including a step of determining fine position information based on a location of a read envelope peak relative to the code word symbols.

12. A disk including a plurality of tracks; and a spiral write pattern consisting of a repeated master sequence of a shift code with code words written in spiral crossings of the respective tracks.

13. The disk of claim 12 wherein the code words of the shift code consist of N symbols; and there are no repeating patterns of N symbols in the master sequence.

14. The disk of claim 13 wherein the code words of the shift code overlap; and the master sequence consists of the non-overlapping symbols of a plurality of adjacent code words.

15. The disk of claim 14 wherein the code words overlap by N−1 symbols, and any N symbols of the master sequence produce a code word.

16. The disk of claim 12 wherein the radial position of the reader is relative to a range of tracks on the disk.

17. The disk of claim 12 wherein the shift code is circular.

* * * * *